(12) United States Patent
Yamakawa

(10) Patent No.: US 12,157,394 B2
(45) Date of Patent: Dec. 3, 2024

(54) CONTROLLER FOR ELECTRIFIED VEHICLE

(71) Applicant: TOYOTA JIDOSHA KABUSHIKI KAISHA, Toyota (JP)

(72) Inventor: Toshifumi Yamakawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 239 days.

(21) Appl. No.: 17/901,293

(22) Filed: Sep. 1, 2022

(65) Prior Publication Data

US 2023/0139350 A1 May 4, 2023

(30) Foreign Application Priority Data

Nov. 4, 2021 (JP) .................. 2021-180202

(51) Int. Cl.
*B60L 58/12* (2019.01)

(52) U.S. Cl.
CPC ........... *B60L 58/12* (2019.02); *B60L 2210/10* (2013.01); *B60Y 2200/91* (2013.01)

(58) Field of Classification Search
CPC ... B60L 58/12; B60L 2210/10; B60L 2200/91
See application file for complete search history.

(56) References Cited

U.S. PATENT DOCUMENTS

| 10,181,808 B2 | 1/2019 | Asakawa et al. | |
| 2015/0207410 A1* | 7/2015 | Ono | B60L 3/003 307/10.1 |
| 2017/0066332 A1 | 3/2017 | Asakawa et al. | |
| 2020/0044565 A1* | 2/2020 | Suzuki | H02M 7/48 |
| 2021/0281192 A1 | 9/2021 | Suzuki | |
| 2022/0368231 A1* | 11/2022 | Nakabayashi | H02M 1/007 |

FOREIGN PATENT DOCUMENTS

| JP | 2007-166874 A | 6/2007 |
| JP | 2009-112163 A | 5/2009 |
| JP | 5225761 B2 | 7/2013 |
| JP | 2017-051065 A | 3/2017 |
| JP | 6873357 B1 | 5/2021 |
| WO | 2007/069055 A1 | 6/2007 |

* cited by examiner

*Primary Examiner* — Gary L Laxton
(74) *Attorney, Agent, or Firm* — Oliff PLC

(57) ABSTRACT

A controller disclosed in the specification is implemented in an electrified vehicle in which a motor generator used to drive a wheel is connected to a battery via a DC-DC converter. The controller is configured to be able to execute a process of acquiring a target value of output voltage of the DC-DC converter, a process of acquiring a measured value of the output voltage of the DC-DC converter, a process of acquiring a direction of reactor current flowing through a reactor of the DC-DC converter, and a process of executing feedback control over an operation of the DC-DC converter in accordance with a deviation of the measured value from the target value of the output voltage. The process of executing feedback control may include a process of determining a feedback gain that varies with the direction of the reactor current.

5 Claims, 3 Drawing Sheets

CONTROLLER FOR ELECTRIFIED VEHICLE

CROSS-REFERENCE TO RELATED APPLICATION

This application claims priority to Japanese Patent Application No. 2021-180202 filed on Nov. 4, 2021, incorporated herein by reference in its entirety.

BACKGROUND

1. Technical Field

A technology disclosed in the specification relates to a controller for an electrified vehicle. More specifically, the technology relates to a controller that controls a DC-DC converter in an electrified vehicle in which a motor generator used to drive a wheel is connected to a battery via the DC-DC converter.

2. Description of Related Art

A controller described in Japanese Unexamined Patent Application Publication No. 2017-051065 (JP 2017-051065 A) acquires a target value of reactor current flowing through a reactor of a DC-DC converter. The controller acquires a measured value of the reactor current. The controller executes feedback control in accordance with a deviation of the measured value from the acquired target value of the reactor current.

When the controller executes feedback control, the controller further determines whether the frequency of variations in the electric power of a motor generator of an electrified vehicle falls within resonant frequencies at which resonance occurs in a circuit of a DC-DC converter. The controller changes a feedback gain in accordance with whether the frequency of electric power variations is included in the resonant frequency. When the frequency of variations in the electric power falls within the resonant frequencies, the controller changes the frequency of variations in the electric power to a frequency outside the resonant frequencies by changing the feedback gain. Thus, it is possible to reduce occurrence of resonance in the circuit of the DC-DC converter.

SUMMARY

A reactor current flows through the reactor of the DC-DC converter in a direction that changes in accordance with an output direction of the DC-DC converter. In the controller described in JP 2017-051065 A, the feedback gain is similarly determined regardless of the direction of reactor current. However, the inventors found that harmful disturbance characteristics in feedback control changed depending on the direction of reactor current. The specification provides a technology for making it possible to accurately control the operation of a DC-DC converter by addressing disturbance characteristics that change in accordance with the direction of reactor current.

A controller disclosed in the specification is implemented in an electrified vehicle in which a motor generator used to drive a wheel is connected to a battery via a DC-DC converter. The controller is configured to be able to execute a process of acquiring a target value of output voltage of the DC-DC converter, a process of acquiring a measured value of the output voltage of the DC-DC converter, a process of acquiring a direction of reactor current flowing through a reactor of the DC-DC converter, and a process of executing feedback control over an operation of the DC-DC converter in accordance with a deviation of the measured value from the target value of the output voltage. The process of executing feedback control may include a process of determining a feedback gain that varies with the direction of the reactor current.

With the above configuration, the controller determines a feedback gain that varies with the direction of reactor current. Thus, it is possible to accurately control the operation of the DC-DC converter by addressing disturbance characteristics that change in accordance with the direction of reactor current.

The details of the technology disclosed in the specification and further improvement will be described in "Detailed Description of Embodiments".

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
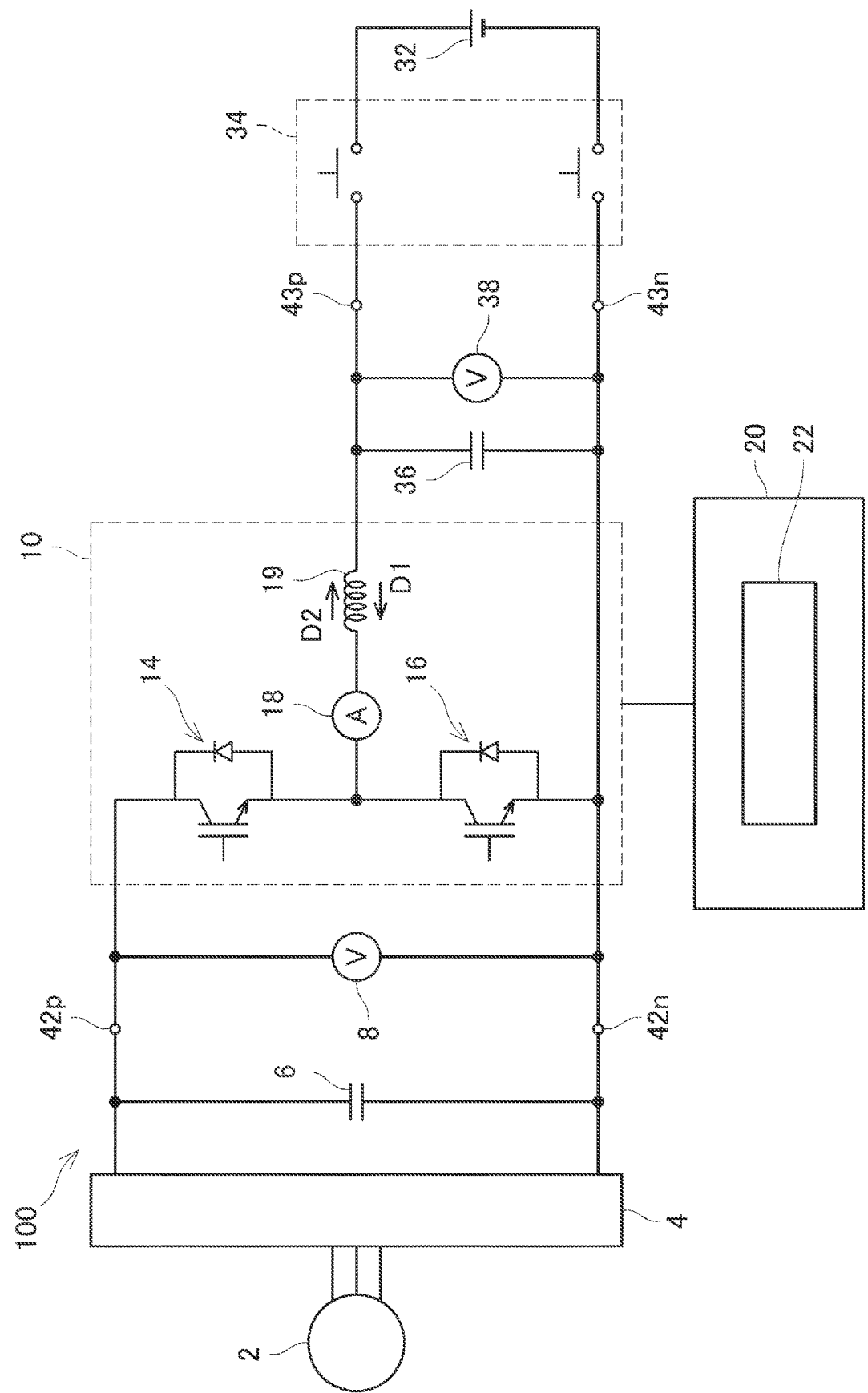
FIG. 1 schematically shows a circuit diagram of an electrified vehicle that includes a controller of an embodiment.

In one embodiment of the technology, the reactor current may flow through the reactor in a first direction when electric power is supplied from the battery to the motor generator, and the reactor current may flow through the reactor in a second direction different from the first direction when electric power is supplied from the motor generator to the battery. In this case, in the process of determining the feedback gain, when the reactor current flows in the first direction with a first magnitude, the feedback gain may be determined at a first value, and, when the reactor current flows in the second direction with the first magnitude, the feedback gain may be determined at a second value greater than the first value. When electric power is supplied from the battery to the motor generator, that is, when the reactor current flows in the first direction, motoring for driving the motor generator is performed by stepping up the electric power of the battery by using the DC-DC converter. When electric power is supplied from the motor generator to the battery, that is, when the reactor current flows in the second direction, regeneration for charging the battery is performed by stepping down the electric power generated by the motor generator by using the DC-DC converter. The inventors found that, when regeneration was performed, the influence caused by disturbance during regeneration was reduced by using a feedback gain greater than a feedback gain during motoring. With such a configuration, it is possible to reduce the influence caused by disturbance during regeneration by using a feedback gain having the second value.

In one embodiment of the technology, the controller may be configured to be able to further execute a process of acquiring a measured value of the reactor current. In this case, in the process of determining the feedback gain, when the magnitude of the reactor current falls within a predetermined range and the reactor current flows in the second direction, the feedback gain may be determined so as to increase as the magnitude of the reactor current increases. In another embodiment, the feedback gain may be determined so as to change in a stepwise manner.

In one embodiment of the technology, in the process of determining the feedback gain, when the magnitude of the reactor current falls within a predetermined range and the reactor current flows in the first direction, the feedback gain may be determined at the same value regardless of the magnitude of the reactor current. In another embodiment, when the reactor current flows in the first direction, the feedback gain may be determined so as to reduce as the magnitude of the reactor current increases.

In one embodiment of the technology, in the process of determining the feedback gain, when the reactor current flows in the second direction, the feedback gain may be determined so as to increase for the reactor current with the same magnitude as the target value or the measured value reduces. The inventors particularly found that disturbance easily changed in a region in which the target value or the measured value was relatively small. With such a configuration, the controller is able to reduce the influence caused by disturbance that occurs in a region in which the target value or the measured value is relatively low.

In one embodiment of the technology, the controller may include a memory configured to store a map or a relational expression describing a relationship between a direction and magnitude of the reactor current and the feedback gain. With such a configuration, for example, in comparison with the case where the feedback gain is determined at a predetermined value when the magnitude of the reactor current exceeds a predetermined threshold, it is possible to minutely determine the feedback gain.

In one embodiment of the technology, the controller may be configured to be able to further execute a process of acquiring a target value of the reactor current. In this case, in the process of executing the feedback control, an operation of the DC-DC converter may be subjected to feedback control in accordance with a deviation of the measured value from the target value of the reactor current. With such a configuration, in comparison with a configuration that feedback control over the DC-DC converter is executed based on only a deviation of voltage, it is possible to increase the response of feedback control.

EMBODIMENT

A controller of an embodiment will be described with reference to the accompanying drawings. First, an electrified vehicle 100 equipped with a controller 20 of the embodiment will be described with reference to FIG. 1. FIG. 1 mainly shows a circuit related to a drive-train of the electrified vehicle 100. The electrified vehicle 100 includes a motor generator 2, an inverter 4, a high-voltage capacitor 6, a high voltage sensor 8, a DC-DC converter 10, a low-voltage capacitor 36, a low voltage sensor 38, a system main relay 34, a battery 32, and the controller 20. The electrified vehicle 100 runs by supplying the motor generator 2 with electric power stored in the battery 32. In other words, the motor generator 2 drives a wheel (not shown) of the electrified vehicle 100. The motor generator 2 also functions as a generator that generates electric power by using torque during braking. Electric power generated by the motor generator 2 is charged into the battery 32. The motor generator 2 is connected to the battery 32 via the DC-DC converter 10.

Each of the capacitors 6, 36 is a so-called smoothing capacitor and is provided to stabilize the voltage of the circuit. The high voltage sensor 8 measures the voltage between a high-voltage positive electrode 42p and a high-voltage negative electrode 42n. The low voltage sensor 38 measures the voltage between a low-voltage positive electrode 43p and a low-voltage negative electrode 43n.

The DC-DC converter 10 includes two switching elements 14, 16, a current sensor 18, and a reactor 19. The DC-DC converter 10 changes the voltage by turning on or off the two switching elements 14, 16. A technology that the DC-DC converter 10 changes the voltage is known, so the description thereof is omitted here.

The controller 20 is a computer that includes a memory 22. Although not shown in the drawing, the controller 20 acquires running information related to running of the electrified vehicle 100, including accelerator operation amount information, brake depression information, vehicle speed information, and the like. The controller 20 controls the DC-DC converter 10 based on the acquired running information. When an accelerator is depressed by a driver of the electrified vehicle 100 to drive the motor generator 2 at higher speed, the controller 20 supplies electric power from the battery 32 to the motor generator 2. In this case, the controller 20 executes so-called motoring control. Thus, the DC-DC converter 10 converts electric power output from the battery 32 to high-voltage power and supplies the high-voltage power to the motor generator 2. On the other hand, when a brake is depressed by the driver of the electrified vehicle 100 to perform regeneration by using the torque of the motor generator 2, the controller 20 supplies electric power from the motor generator 2 to the battery 32. In this case, the controller 20 executes so-called regenerative control. Thus, the DC-DC converter 10 converts electric power generated by the motor generator 2 to low-voltage power and supplies the low-voltage power to the battery 32.

The controller 20 acquires a measured value of the current sensor 18 of the DC-DC converter 10. Thus, the controller 20 acquires a current flowing through the reactor 19 (hereinafter, the current may be referred to as reactor current IL) from the current sensor 18. As shown in FIG. 1, when the controller 20 executes motoring control, the reactor current IL flows in a first direction D1. When the controller 20 executes regenerative control, the reactor current IL flows in a second direction D2.

A process that the controller 20 executes to control the DC-DC converter 10 will be described with reference to FIG. 2. The controller 20 constantly executes the process of FIG. 2 during running of the electrified vehicle 100. Here, a process that the controller 20 executes during motoring control will be described. The controller 20 acquires a target value Vt of output voltage of the DC-DC converter 10 by calculating the target value Vt from the running information (S2). The controller 20 acquires a measured value Vm of output voltage of the DC-DC converter 10 from the high voltage sensor 8 (see FIG. 1) (S4). Subsequently, the controller 20 acquires a measured value ILm of the reactor current IL from the current sensor 18 (see FIG. 1) (S6). The controller 20 executes feedback control over the operation of the DC-DC converter 10 such that the output voltage of the DC-DC converter 10 is equal to the target value Vt. Although not limited, proportional-plus-integral control is adopted for feedback control in the present embodiment, and the operation of the DC-DC converter 10 is controlled in accordance with an instantaneous value of a deviation of the measured value Vm from the target value Vt and an integrated value obtained by integrating the deviation. Alternatively, feedback control over the DC-DC converter 10 may be executed based on only an instantaneous value of the deviation, as in the case of so-called proportional control. Hereinafter, for the sake of clear description, a proportional term (feedback control based on an instantaneous value of the deviation) in proportional-plus-integral control will be mainly described.

The controller 20 determines a feedback gain GV based on the measured value ILm of the reactor current IL, acquired in the process of S6 (S8). The details that the controller 20 determines the feedback gain GV will be described later with reference to FIG. 3.

The controller 20 determines a first operation amount (Vt−Vm)×GV for the DC-DC converter 10 by multiplying a deviation between the target value Vt acquired in the process of S2 and the measured value Vm acquired in the process of S4 by the feedback gain GV determined in the process of S8 (S10).

The controller 20 acquires a target value ILt of the reactor current IL by calculating the target value ILt from the target value Vt of the output voltage (S12). Subsequently, the controller 20 determines a feedback gain GI based on the measured value ILm of the reactor current IL, acquired in the process of S6 (S14). Although not shown in the drawing, the controller 20 stores a table for a feedback gain GI associated with a target value ILt and a measured value ILm in the memory 22 (see FIG. 1). The controller 20 determines the value of the feedback gain GI from the table in the memory 22.

The controller 20 determines a second operation amount (ILt−ILm)×GI for the DC-DC converter 10 by multiplying a deviation of the target value ILt acquired in the process of S12 from the measured value ILm acquired in the process of S6 by the feedback gain GI determined in the process of S14 (S16).

The controller 20 determines a duty ratio for turning on or off the switching elements 14, 16 (see FIG. 1) of the DC-DC converter 10 by using the first operation amount (Vt−Vm)×GV calculated in S10 and the second operation amount (ILt−ILm)×GI calculated in S16 (S20). In this way, the controller 20 executes feedback control over the operation of the DC-DC converter 10.

When regenerative control is executed, the controller 20 acquires the measured value Vm from the low voltage sensor 38 in the process of S4 and executes feedback control over the operation of the DC-DC converter 10.

A process that the controller 20 determines the feedback gain GV in the process of S8 of FIG. 2 will be described with reference to FIG. 3. FIG. 3 shows a gain map M1 stored in the memory 22 of the controller 20. The gain map M1 is a map that describes the value of the feedback gain GV used to reduce disturbance, such as resonance, that occurs at the time of executing feedback control over the DC-DC converter 10 in the electrified vehicle 100 by measuring the disturbance.

Figure 2:
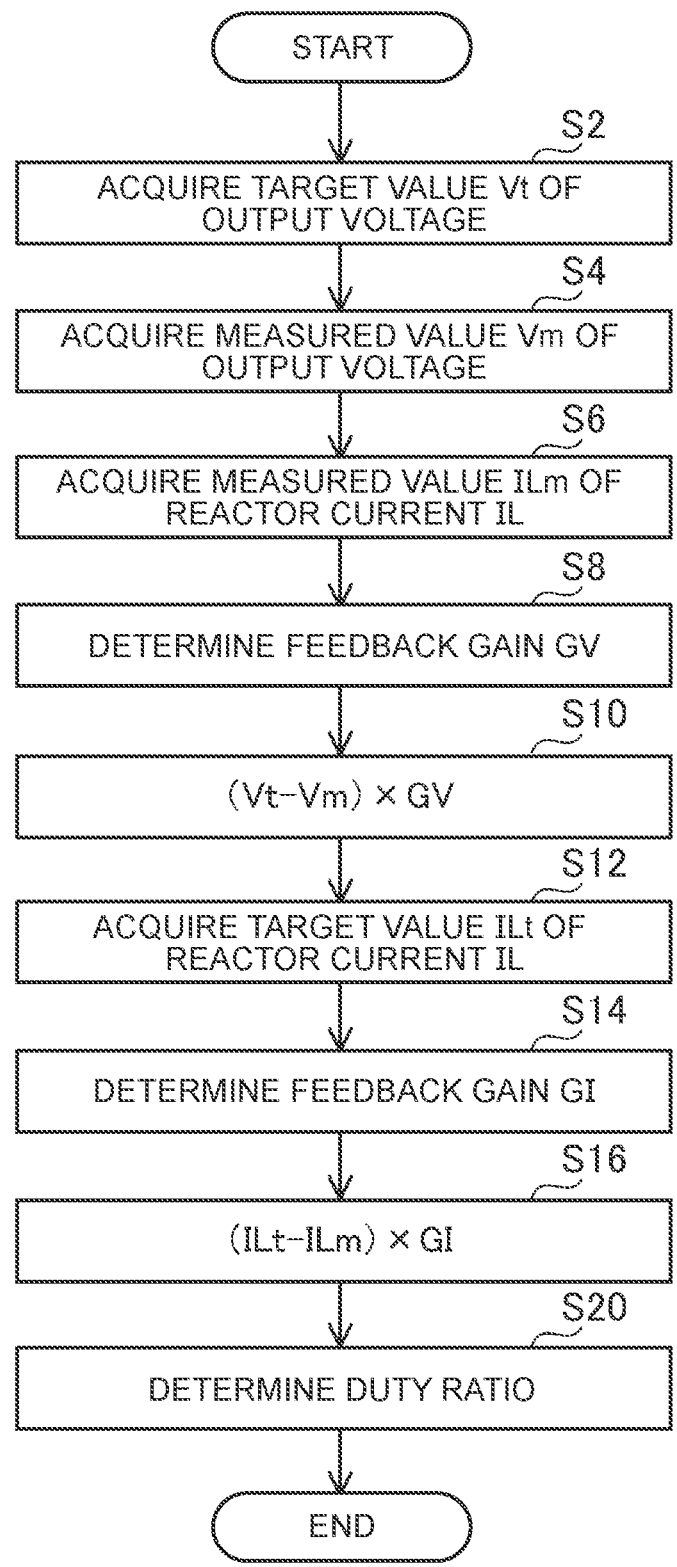
FIG. 2 is a flowchart of a process that the controller executes.
Figure 3:
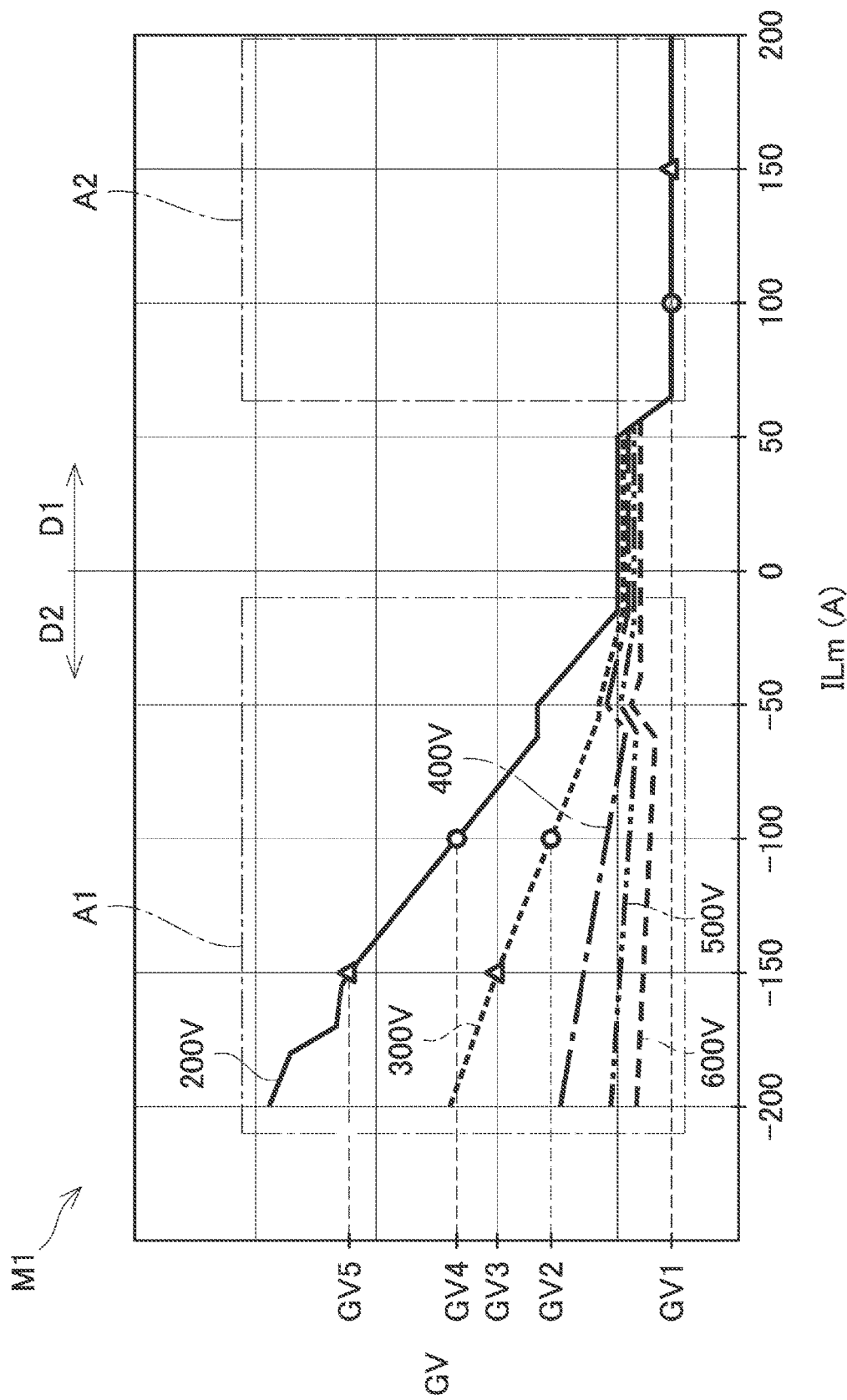
FIG. 3 is a gain map that the controller uses to determine the value of a feedback gain.

As shown in FIG. 3, the gain map M1 describes a relationship between a measured value ILm of the reactor current IL and a feedback gain GV for each measured value Vm of the output voltage, acquired in S4 of FIG. 2. Therefore, in FIG. 3, the line type of a graph is changed for each measured value Vm. In a modification, the gain map M1 may describe a relationship between a measured value ILm of the reactor current IL and a feedback gain GV for each target value Vt of the output voltage, acquired in S2 of FIG. 2.

In the current sensor 18, when the reactor current IL flows in the first direction D1, a measured value ILm is measured as a positive value. In the current sensor 18, when the reactor current IL flows in the second direction D2, a measured value ILm is measured as a negative value. In other words, when the controller 20 executes motoring control, the measured value ILm is a positive value; whereas, when the controller 20 executes regenerative control, the measured value ILm is a negative value. In this way, the controller 20 is able to acquire the direction of the reactor current IL by acquiring the measured value ILm of the reactor current IL from the current sensor 18 and determining the sign of the measured value ILm.

When the controller 20 acquires the measured value ILm in the process of S6 of FIG. 2, the controller 20 applies the acquired measured value ILm to the graph for the measured value Vm. When, for example, the measured value Vm acquired in S4 of FIG. 2 is 300 V indicated by the narrow dashed line, the reactor current IL flows in the first direction D1, and the measured value ILm is 100 A, the controller 20 determines the value of the feedback gain GV at a first value GV1 from the gain map M1. On the other hand, when the measured value Vm is 300 V, the reactor current IL flows in the second direction D2, and the measured value ILm is −100 A, the controller 20 determines the value of the feedback gain GV at a second value GV2 from the gain map M1.

As is understood from FIG. 3, the second value GV2 is greater than the first value GV1. Even when the value of the reactor current IL is 100 A, the second value GV2 that is determined when the reactor current IL flows in the second direction D2 is different from the first value GV1 that is determined when the reactor current IL flows in the first direction D1. With the existing technology, the value of the feedback gain GV does not depend on the direction of the reactor current IL, and is, for example, similarly determined based on the value of the reactor current IL. However, as shown in FIG. 1, the circuit in which the DC-DC converter 10 is disposed has an asymmetric structure between the motor generator 2 side and the battery 32 side. The inventors found that the harmful disturbance characteristics in feedback control could change depending on the direction of the reactor current IL. As shown in FIG. 2 and FIG. 3, the controller 20 of the specification acquires the direction of the reactor current IL before determining the feedback gain GV and determines a feedback gain GV that varies with the direction. Thus, it is possible to accurately control the operation of the DC-DC converter 10 by addressing disturbance characteristics that change in accordance with the direction of the reactor current IL.

As shown in FIG. 3, in the region within a first range A1 of the gain map M1, the feedback gain GV of which the measured value Vm is 300 V increases as the magnitude of the measured value ILm of the reactor current IL flowing in the second direction D2 increases (that is, toward the left side in FIG. 3). As a result, for example, a third value GV3 that is determined when the measured value Vm is 300 V and the value of the measured value ILm is −150 A is greater than the second value GV2.

On the other hand, in the region within a second range A2 of the gain map M1, regardless of the magnitude of the measured value ILm of the reactor current IL flowing in the first direction D1, the value of the feedback gain GV is held at the first value GV1. In the region within the second range A2, the graphs in the case where the measured values Vm are respectively 200 V, 300 V, 400 V, 500 V, and 600 V are shown so as to overlap one another. In other words, in the region within the second range A2, regardless of the magnitude of the measured value Vm, the value of the feedback gain GV is determined at the first value GV1.

In the region within the first range A1 of the gain map M1, in a state where the measured value ILm of the reactor current IL is −100 A, the measured value Vm of the output voltage is 300 V, the feedback gain GV is determined at the second value GV2. However, in a state where the measured value ILm of the reactor current IL is the same −100 A, when the measured value Vm of the output voltage is 200 V, the feedback gain GV is determined at a fourth value GV4. As shown in FIG. 3, the fourth value GV4 is greater than the second value GV2. Similarly, in a state where the measured value ILm of the same reactor current IL is −150 A, a fifth value GV5 that is determined when the measured value Vm of the output voltage is 200 V is greater than the fourth value GV4 that is determined when the measured value Vm of the output voltage is 300 V. In other words, when the reactor current IL flows in the second direction D2, the controller 20 determines the feedback gain GV such that the feedback gain GV increase as the measured value Vm of the output voltage decreases for the reactor current IL with the same magnitude. The inventors found that, particularly, in a region in which the measured value Vm of the output voltage is low, disturbance during regenerative control had a tendency to differ from disturbance during motoring control. The controller 20 determines the feedback gain GV such that the feedback gain GV increases as the measured value Vm of the output voltage decreases. Thus, it is possible to reduce the influence on feedback control due to disturbance during regenerative control in a region in which the measured value Vm of the output voltage is low.

The controller 20 executes not only feedback control over the operation of the DC-DC converter 10 based on a deviation of the output voltage but also feedback control over the operation of the DC-DC converter 10 based on a deviation of the reactor current IL as shown in S12, S14, S16 of FIG. 2. Thus, in comparison with a configuration that feedback control based on only a deviation of the output voltage is executed, it is possible to execute feedback control over the operation of the DC-DC converter 10 more quickly. In other words, with such a configuration, it is possible to improve the response of feedback control. As a result, for example, it is possible to reduce the capacitance of each of the capacitors 6, 36.

Specific examples of the technology disclosed in the specification have been described in detail; however, these are only illustrative and are not intended to limit the scope of the appended claims. The technology described in the appended claims also encompasses various modifications and changes from the specific examples illustrated above. Modifications of the above-described embodiment will be described below.

First Modification

In the above-described embodiment, the controller 20 determines the value of the feedback gain GV by using the gain map M1 associated with an instantaneous value of a deviation of a measured value Vm of the output voltage from a target value Vt of the output voltage. In a modification, the controller 20 may store an additional gain map associated with an integrated value obtained by integrating a deviation of a measured value Vm from a target value Vt of the output voltage in the memory 22 and determine the value of the feedback gain GV by using the additional gain map in addition to the gain map M1. In other words, in the present modification, the value of the feedback gain GV may be determined by using a gain map in an integral term (feedback control based on an integrated value of a deviation) of proportional-plus-integral control.

Second Modification

A gain map that the controller 20 uses to determine the feedback gain GV is not limited to the gain map M1. The controller 20 may determine a feedback gain GV by using another gain map calculated based on the resonant frequencies of the configuration of the drive-train of the electrified vehicle 100 instead of the gain map M1. In this case, for example, in the other gain map, in a state where the measured value ILm of the reactor current IL is the same 100 A, when the reactor current IL flows in the second direction D2 (that is, when regenerative control is executed), the feedback gain GV may be determined at the first value GV1. In this case, when the reactor current IL flows in the first direction D1 (that is, when motoring control is executed), the feedback gain GV may be determined at the second value GV2 greater than the first value GV1. In further another modification, the controller 20 may store a relational expression that describes the relationship between the direction and magnitude of a reactor current IL and a feedback gain GV in the memory 22 instead of the gain map M1.

Third Modification

The controller 20 may determine the feedback gain GV at a certain predetermined value when the direction of the reactor current IL is the first direction D1 and determine the feedback gain GV at another predetermined value when the direction of the reactor current IL is the second direction D2. In other words, the controller 20 may determine the feedback gain GV regardless of a change in the magnitude of the reactor current IL.

Fourth Modification

In the gain map M1, in the first range A1, the feedback gain GV does not need to continuously change as shown by the graphs of FIG. 3. For example, the feedback gain GV may change in a stepwise manner.

Fifth Modification

The controller 20 may determine the same value of the feedback gain GV when the measured value ILm of the reactor current IL is the same regardless of the measured value Vm of the output voltage in the first range A1.

Sixth Modification

The controller 20 does not need to execute feedback control over the operation of the DC-DC converter 10 in accordance with a deviation of a measured value ILm of the reactor current IL from a target value ILt of the reactor current IL. In the present modification, the processes of S12, S14, and S16 of FIG. 2 may be omitted.

Seventh Modification

The controller 20 may, for example, acquire the direction of the reactor current IL from the output torque of the motor generator 2 instead of the measured value ILm of the reactor current IL, acquired from the current sensor 18. In this case, the DC-DC converter 10 does not need to include the current sensor 18. In further another modification, the current sensor 18 may be disposed between the DC-DC converter 10 and the system main relay 34.

The technical elements described in the specification or the drawings exhibit technical usability solely or in various combinations and are not limited to combinations of the appended claims at the time of filing the application. The technology illustrated in the specification and drawings can achieve multiple purposes at the same time and has technical usability by achieving one of those purposes.

What is claimed is:

1. A controller for an electrified vehicle in which a motor generator used to drive a wheel is connected to a battery via a DC-DC converter, wherein:
the controller is configured to be able to execute
a process of acquiring a target value of output voltage of the DC-DC converter,
a process of acquiring a measured value of the output voltage of the DC-DC converter,
a process of acquiring a direction of a reactor current flowing through a reactor of the DC-DC converter, and
a process of executing feedback control over an operation of the DC-DC converter in accordance with a deviation of the measured value from the target value of the output voltage;
the process of executing the feedback control includes a process of determining a feedback gain that varies with the direction of the reactor current;
the reactor current flows through the reactor in a first direction when electric power is supplied from the battery to the motor generator, and the reactor current flows through the reactor in a second direction different from the first direction when electric power is supplied from the motor generator to the battery; and
in the process of determining the feedback gain, when the reactor current flows in the first direction with a first magnitude, a first value is determined as the feedback gain, and when the reactor current flows in a second direction with the first magnitude, a second value greater than the first value is determined as the feedback gain.

2. The controller according to claim 1, wherein:
the controller is configured to be able to further execute a process of acquiring a measured value of the reactor current; and
in the process of determining the feedback gain, the feedback gain is determined in accordance with a magnitude of the reactor current.

3. The controller according to claim 2, wherein, in the process of determining the feedback gain, when the magnitude of the reactor current falls within a predetermined range and the reactor current flows in the second direction, the feedback gain is determined so as to increase as the magnitude of the reactor current increases.

4. The controller according to claim 2, wherein, in the process of determining the feedback gain, when the magnitude of the reactor current falls within a predetermined range and the reactor current flows in the first direction, the feedback gain is determined so as to be the same value regardless of the magnitude of the reactor current.

5. The controller according to claim 2, wherein, in the process of determining the feedback gain, when the reactor current flows in the second direction, the feedback gain is determined so as to increase for the reactor current with the same magnitude as the target value or the measured value of the output voltage decreases.

\* \* \* \* \*